G. W. CRAWFORD.
TURBINE.
APPLICATION FILED JUNE 29, 1914.
1,138,630.
Patented May 11, 1915.
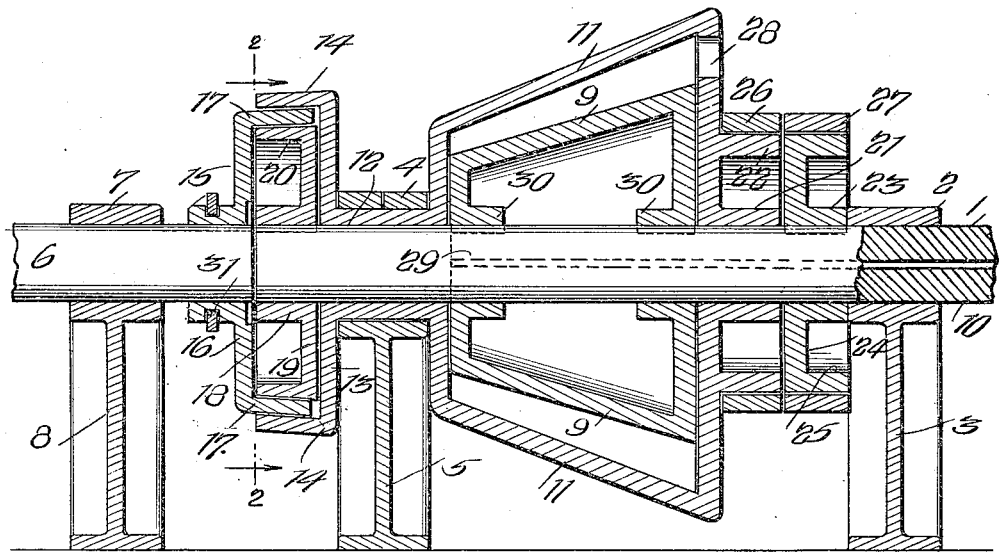
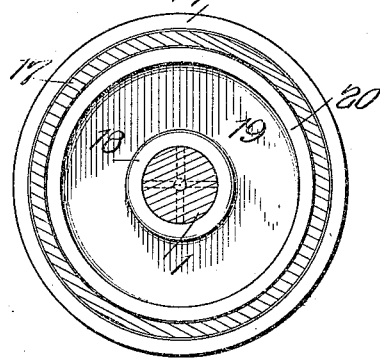
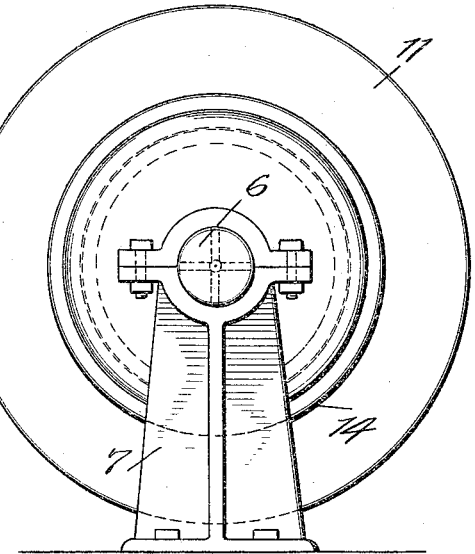
WITNESSES
INVENTOR
Guy W. Crawford,
BY
ATTORNEYS

UNITED STATES PATENT OFFICE.

GUY W. CRAWFORD, OF FREMONT, MICHIGAN.

TURBINE.

1,138,630.   Specification of Letters Patent.   Patented May 11, 1915.

Application filed June 29, 1914. Serial No. 847,855.

*To all whom it may concern:*

Be it known that I, GUY W. CRAWFORD, a citizen of the United States, and a resident of Fremont, in the county of Newaygo and State of Michigan, have made certain new and useful Improvements in Turbines, of which the following is a specification.

My invention is an improvement in turbines, and has for its object to provide a device of the character specified wherein the two elements of the turbine are mounted to rotate, and wherein other mechanism is provided for fixing either of the said elements, to make the said element the stator and the other the rotor, and wherein clutch mechanism is provided for permitting either of said elements to be connected to the driving shaft.

In the drawing: Figure 1 is a longitudinal vertical section of the turbine; Fig. 2 is a section on the line 2—2 of Fig. 1, looking in the direction of the arrow; and Fig. 3 is an end view looking in the same direction as Fig. 2.

The shaft 1 which supports the turbine, and which is the driving shaft, is journaled in a sectional bearing 2 at one end, supported by an upright or standard 3, and in a sectional bearing 4 near the other end, the said bearing being supported by a standard or upright 5. The driven shaft 6 is arranged in alinement with the driving shaft, and with one end adjacent to one end of the driving shaft, shaft 6 being supported by bearing 7, supported by an upright or standard 8.

The rotor 9 of the turbine is keyed to the shaft 1, and the motive fluid is admitted by a passage or duct 10 at the center of the shaft. The outer casing 11 of the turbine has integral therewith at its small end, a sleeve 12, which extends through the bearing 4, and at the opposite side of the bearing from the casing, the sleeve is provided with a radial rib 13 having a marginal, lateral flange 14. A sleeve 15 is arranged on the inner end of the shaft 6 and the said sleeve is provided with a radial rib 16 having a marginal lateral flange 17 which fits within the flange 14 of the sleeve 12. A collar 18 is arranged on the inner end of the driving shaft 1 between the sleeves 12 and 15, and the said sleeve has a radial rib 19 provided with a marginal flange 20 which fits within the flange 17 of the sleeve 15. At the opposite end from the sleeve 12, the casing 11 is provided with a laterally extending sleeve 21 fitting the shaft 1, and with a flange 22 spaced apart radially from the sleeve 21. A collar 23 encircles the shaft 1 between the bearing 2 and the sleeve 21, and the said collar is provided with a lateral rib 24 having a marginal, lateral flange 25 which is of the same diameter as the flange 22 on the casing 11. Brake bands 26 and 27 encircle the flanges 22 and 25, and either band may be operated to clutch the adjacent flange, to hold the said flange from rotation.

The motive fluid is, as before stated, admitted by way of the passage 10 and through the radial ports 29 leading from the passage to the space between the casing 11 and the rotor 9, and it will be understood that the usual blades are provided on the peripheral surface of the rotor and on the inner surface of the casing 11. After the motive fluid has served its purpose, it is exhausted through the exhaust opening 28. The rotor 9 is provided with inwardly extending sleeves or bushings 30 at its ends, which fit the shaft 1 and are secured thereto in any suitable manner. It will be understood that the rotor 9 and the casing 11 are both mounted for rotation and both are in fact rotors. By means of the brake bands 26 and 27 either element may be converted into the stator and the other into the rotor. The elements are in fact alternately rotor and stator. The sleeve 23 is keyed to the shaft 1 as is also the element 9, and the sleeve 18. The sleeve 15 is keyed to the shaft 6 and the sleeve 12 is rigid with the casing 11. The flange 17 is designed to be connected to either flange 14 or 20, and it will be evident that when the said flange is connected to the flange 14, the driven shaft will rotate with the casing 11. On the other hand, when the flange 17 is connected to the flange 20 the driven shaft will rotate with the driving shaft and in the same direction.

The operation of the device is as follows: In operation, the motive fluid is admitted through the passage 10, and one of the brake bands 26 or 27 is operated to fix the element connected therewith. For instance, when it is desired to drive the driven shaft 6 in the forward motion, the brake band 26, is operated to fix the casing 11. When now the motive fluid is admitted, the rotor or inner casing 9 is driven forwardly, and when the flange 17 is clutched to the flange 20, the shafts 1 and 6 will rotate together, as a single shaft. When it is desired to reverse, the brake band 26 is loosened, the brake band 27 is tightened, and the clutch connecting the flanges 17 and 20 is released. The motive fluid will now drive the casing 11 in the reverse direction, and when the clutch is operated to connect the flanges 17 and 14, the shaft 6 will rotate with the casing 11 in the reverse direction.

It will be evident that any form of turbine may be used. The invention resides in the mounting of the two elements of the turbine in such manner that either may rotate, and in providing means for fixing one of the said elements, and in providing other means for clutching the driven shaft to either of the said elements.

It will be noticed from an inspection of Fig. 1, that the flanges 14, 17 and 20 are tapering or frusto-conical, so that when the sleeve 15 is moved longitudinally of the shaft 6 the flange thereof may be engaged with either flange to connect the shaft 6 with either the inner or the outer casing. The sleeve 15 is feathered on the shaft 6, and is provided with an annular groove, which is engaged by the arms 31 of a fork on the operating lever (not shown) which is provided for operating the sleeve.

I claim:—

1. In combination, a driving shaft and a driven shaft arranged in alinement and with their inner ends adjacent, a turbine comprising an inner casing keyed to the driving shaft and an outer casing journaled on the driving shaft, means for supporting the driving shaft, the driven shaft, and the outer casing for rotation, a brake wheel keyed to the driving shaft, a brake wheel rigid with the outer casing, a brake band coöperating with each wheel to prevent the said wheel from rotation, a disk secured to the driving shaft, and having a lateral flange, a disk secured to the driven shaft and having a lateral flange extending outside of the disk on the driving shaft, a disk secured to the outer casing and having a flange fitting outside the flange of the disk on the driven shaft, clutch mechanism for connecting the flange of the driven shaft to either of the other flanges, said driving shaft having a central passage for the motive fluid, and having radial ports delivering to the space between the inner and outer casing, said inner and outer casing having blades, and the outer casing having an exhaust port.

2. In combination, a driving shaft and a driven shaft arranged in alinement, a turbine consisting of an inner member keyed to the driving shaft, and an outer member journaled on the driving shaft, brake mechanism in combination with each of the said members for preventing rotation thereof, a disk secured to the driving shaft and having a lateral flange, a disk secured to the driven shaft and having a lateral flange extending outside of the flange of the disk on the driving shaft, a disk secured to the outer member and having a flange fitting the outside of the flange of the disk on the driven shaft, and clutch mechanism for connecting the flange of the driven shaft to either of the other flanges.

GUY W. CRAWFORD.

Witnesses:
JOHN E. NASH,
FLOYD J. BUNCH.

Copies of this patent may be obtained for five cents each, by addressing the "Commissioner of Patents, Washington, D. C."